US012371213B2

(12) United States Patent
Winkelmann et al.

(10) Patent No.: US 12,371,213 B2
(45) Date of Patent: Jul. 29, 2025

(54) LID SUPPLY FOR A SEALER AND A SEALER

(71) Applicant: FERRUM PACKAGING AG, Schafisheim (CH)

(72) Inventors: Jörn Winkelmann, Barmstedt (CH); Peter Stoltenberg, Aarau (CH)

(73) Assignee: FERRUM PACKAGING AG, Schafisheim (CH)

( * ) Notice: Subject to any disclaimer, the term of this patent is extended or adjusted under 35 U.S.C. 154(b) by 0 days.

(21) Appl. No.: 18/218,525

(22) Filed: Jul. 5, 2023

(65) Prior Publication Data

US 2024/0025589 A1 Jan. 25, 2024

(30) Foreign Application Priority Data

Jul. 19, 2022 (EP) .................................... 22185618

(51) Int. Cl.
*B21D 51/26* (2006.01)
*B65B 7/28* (2006.01)
(Continued)

(52) U.S. Cl.
CPC ............ *B65B 31/041* (2013.01); *B21D 51/26* (2013.01); *B21D 51/2653* (2013.01); *B21D 51/2661* (2013.01); *B21D 51/2692* (2013.01); *B65B 7/2807* (2013.01); *B65B 7/2892* (2013.01); *B65B 31/028* (2013.01); *B65B 55/08* (2013.01);
(Continued)

(58) Field of Classification Search
CPC ................ B21D 51/26; B21D 51/2653; B21D 51/2661; B21D 51/2692; B65B 7/2807; B65B 7/2857; B65B 7/2892; B65B 31/028; B65B 31/041; B65B 55/08; B65B 55/10;
(Continued)

(56) References Cited

U.S. PATENT DOCUMENTS 1,423,591 A * 7/1922 Bach ...................... B21D 51/32
53/90
2,771,644 A * 11/1956 Martin ...................... A61L 2/07
422/119
(Continued)

FOREIGN PATENT DOCUMENTS

WO 2005056465 A1 6/2005
WO 2013009226 A1 1/2013

OTHER PUBLICATIONS

European Search Report issued Jan. 19, 2023 in corresponding European Application No. 22185618.0.

*Primary Examiner* — Stephen F. Gerrity
(74) *Attorney, Agent, or Firm* — Global IP Counselors, LLP

(57) ABSTRACT

A sealer for sealing a container includes a working space, the container capable of being sealed with a lid from a plurality of lids in the working space, a housing surrounding the working space, and a lid supply configured to supply the
(Continued)

plurality of the lids in a lid stack to the working space. The lid supply includes a first section which is arranged in the working space in such a way that the first section is surrounded by the housing, and a second section arranged outside the housing, and the lid supply comprising a seal arranged between the first section and the second section in such a way that the first section is capable of being sealed off from the second section.

18 Claims, 5 Drawing Sheets

(51) Int. Cl.

| | |
|---|---|
| ***B65B 31/02*** | (2006.01) |
| ***B65B 31/04*** | (2006.01) |
| ***B65B 55/08*** | (2006.01) |
| ***B65B 55/10*** | (2006.01) |
| ***B65B 55/24*** | (2006.01) |
| ***B67B 3/00*** | (2006.01) |

(52) U.S. Cl.
CPC .............. *B65B 55/10* (2013.01); *B65B 55/24* (2013.01); *B67B 3/003* (2013.01); *B65B 7/2857* (2013.01)

(58) Field of Classification Search
CPC ........... B65B 55/24; B67B 3/003; B67B 3/06; B67B 3/10; B65G 59/062
USPC ....... 413/2, 3, 27, 31, 35, 47, 48; 53/90, 94, 53/308, 309, 366
See application file for complete search history.

(56) References Cited

U.S. PATENT DOCUMENTS

| | | | | | |
|---|---|---|---|---|---|
| 3,323,856 | A * | 6/1967 | Guckel | B65B 55/10 | 422/291 |
| 3,352,629 | A * | 11/1967 | Iverson | B65B 55/10 | 221/222 |
| 3,618,550 | A * | 11/1971 | Mojden et al. | B21D 51/2692 | 198/418.7 |
| 3,780,308 | A * | 12/1973 | Nablo | B67C 7/0073 | 250/493.1 |
| 4,323,169 | A * | 4/1982 | Guigan | B65G 59/062 | 221/124 |
| 4,775,274 | A * | 10/1988 | Ono et al. | B65G 43/08 | 413/66 |
| 4,981,649 | A * | 1/1991 | Shibauchi et al. | B65B 7/2807 | 53/167 |
| 5,335,810 | A * | 8/1994 | Holloway | B65B 7/2807 | 221/10 |
| 2019/0177017 | A1 | 6/2019 | Scott et al. | | |
| 2021/0403302 | A1* | 12/2021 | Riedel et al. | B67B 3/06 | |

* cited by examiner

LID SUPPLY FOR A SEALER AND A SEALER

CROSS-REFERENCE TO RELATED APPLICATION

This application claims priority to European Patent Application No. 22185618.0 filed Jul. 19, 2022, the contents of which are hereby incorporated by reference in its entirety.

BACKGROUND

Technical Field

The disclosure relates to a sealer for sealing a container. The disclosure further relates to a lid supply for a sealer and to a method of supplying a lid to a sealer according to the disclosure.

Background Information

During the filling of beverage cans or food cans, the cans pass through a can sealer after being filled with the beverage or food, whereby the filled can bodies enter via a feed path and can lids enter via a further feed path. The can sealer usually has several similar stations arranged in a carousel shape, in each of which a can is sealed by a can lid. The can lids are guided onto the can bodies and held on the can body by a holding plate of a seaming head. This holding also serves to fix the cans against breaking out of the circular path passed by the cans in the can sealer due to the centrifugal force. In the can sealer, the can bodies with the can lid are seamed over a seaming roller at the edges and thus sealed. Normally, the can with the can lid is additionally rotated around its own axis of symmetry by the seaming head. For rotation, the seaming rollers and seaming heads are arranged on a respective seaming shaft.

A generic can sealer is described in DE 749636 and DE 4234115 A1. The can sealer comprises a clamping device for receiving a can to be sealed. In the operating state, the can to be sealed is introduced into the clamping device and secured by the clamping device in axial and radial direction. A can lid is also introduced centered over the can opening of the can to be sealed. The can has a circumferential can flange in the area of the can opening and the can lid has a circumferential can lid flange. For sealing the can opening by the can lid, the can sealer additionally comprises two seaming rollers, each mounted rotatable about an axis, which press the can flange and the can lid flange together by a force acting substantially radially, the pressing being effected by a continuous rolling in the circumferential direction along the circumference of the can opening.

A further can sealer is known from GB 2098899 A. The can sealer comprises a clamping device for receiving the can to be sealed and a seaming roller. In the operating state, the can to be sealed is introduced into the clamping device and secured by the clamping device in the axial and radial directions. A can lid is also introduced centered over the can opening of the can to be sealed.

The can has a circumferential can flange in the area of the can opening of the can body and the can lid has a circumferential can lid flange, which are seamed together.

In order to place the can lids on the can bodies or the lids on the containers, the can lids are supplied to the can sealer by a lid supply and placed on the can bodies.

For a better understanding of the subject matter of the present disclosure, a conventional lid supply known from the state of the art is described in the following on the basis of FIG. 1.

For a better distinction of the known state of the art from the present disclosure, reference signs to features of known devices are provided with an inverted comma (in FIG. 1) in the context of this application, whereas features to devices according to the disclosure or their components do not carry an inverted comma.

FIG. 1 shows a schematic representation of a sealer 1000' for sealing a container with a lid supply 1'.

The sealer 1000' comprises a working space 2', in which the containers can be sealed with a lid 101', and a housing 20' surrounding the working space 2'. Furthermore, the sealer 1000' comprises the lid supply 1' for supplying a plurality of the lids 101' in a lid stack to the working space 2'. Here, the lid supply 1' has a first section 11' which is arranged in the working space 2', i.e., it is surrounded by the housing 20', and a second section 12' arranged outside the housing 20'.

SUMMARY

As can be recognized, the lid supply 1' passes through the housing 20', which means that the housing 20' does not enable a clear separation of the working space 2' from the environment 7'.

In particular, a roof of the housing 20' is represented only schematically and is usually not present in practice.

However, the working space 2' has high requirement for hygiene and should be insulated as well as possible from the outside (the environment 7') or separated from the environment 7'. In addition, the working space 2' should be able to be cleaned as residue-free as possible during cleaning.

However, the lid supply 1' leads via an opening 22' in the working space 2', which is sufficiently large to also enable a format change (i.e., a changeover to another, in particular also larger lid size). Before cleaning, a lid clamp 5' is actuated and all lids 101' located between the lid clamp 5' and the working space 2' are removed. During cleaning, the opening 22' to the environment 7' remains. There is no clear separation between working the space 2' (which is being cleaned) and the environment 7'.

It is therefore a fundamental disadvantage of the devices known from the state of the art that the working space is not separated from the environment.

It is therefore the object of the disclosure to provide a sealer which avoids the disadvantageous effects known from the state of the art. In particular, a sealer with a working space that is as hygienic as possible is to be provided.

The object is met by a sealer according to the disclosure and by the method according to the disclosure.

According to the disclosure, a sealer for sealing a container is proposed. Here, the sealer comprises a working space, in which working space the container can be sealed with a lid. In addition, the sealer comprises a housing surrounding the working space and a lid supply for supplying a plurality of the lids in a lid stack to the working space. The lid supply comprises a first section which is arranged in the working space in such a way that the first section is surrounded by the housing, and a second section arranged outside the housing. In addition, the lid supply comprises a seal which is arranged between the first section and the second section in such a way that the first section can be sealed off from the second section.

Due to this seal, the working space is separated and closed off from an environment, so that the working space can function as a hygienic area, i.e., a hygiene zone. Due to the seal, an undesired entry of gases, vapors, solids and/or liquids from the second section into the first section or from the environment into the working space can therefore be prevented or at least reduced. The seal can thus be arranged in particular between the first section and the second section in such a way that the working space can be sealed by the seal (at least in this area). In cooperation with the housing, the seal thus separates the working space of the sealer (and thus enables the formation of the hygiene zone).

In particular, the housing can be considered a casing, cladding, enclosure, or sheath that at least partially surrounds the working space and thus separates it from the environment.

The working space is the space of the sealer in which the container is preferably sealed with the lid, in particular the space in which the seaming process takes place.

The seal can be designed as a lid clamp and the working space can be sealed by a, cooperation of the lid clamp with the lid stack. The lid clamp can thus in particular hold or stop the lid stack, so that by exerting a force from the lid clamp on the lid stack, the sealing is made possible by stopping the lid stack. In other words, the lid clamp can stop the lid stack in such a way that the working space can be sealed by a cooperation of the lid clamp with the lid stack.

This has the advantage that, on the one hand, a sealing can be achieved within the lid supply in a space-saving manner, and, on the other hand, no additional complex device parts are required. The seal can thus be arranged particularly preferably in an interior space of the lid supply.

In particular, the lid clamp can be expandable from a first state to a second state so that the lid stack can be held by the lid clamp in the second state. For this purpose, the lid clamp can comprise an expansion space which can be filled with a fluid for expansion into the second state. The fluid can be a gas and/or a liquid.

Particularly preferably, the first section comprises a destacking device for separating the lids from the lid stack.

In an embodiment of the disclosure, the housing can comprise a housing portion which surrounds at least the first section of the lid supply, i.e., extends in particular (at least) up to the seal or lid clamp. In this regard, the housing portion can be a part of the housing, which is arranged, attached, or mounted outside on a main housing of the housing. Thus, the working space can be “extended” by the housing portion. In particular, the housing portion can be tubular-shaped. Particularly preferably, the seal is arranged inside the housing portion. In addition, the housing portion can also be surrounded by the main housing.

Of course, the housing portion could also partially or completely surround the second section.

The second section of the lid supply can comprise a lid separator for separating the plurality of lids, in particular metallic lids. In this Way, the lids can be separated before being introduced into the working space, in order to enable a simplified processing.

In addition, the lid supply can comprise a treatment device so that the lids in a predeterminable treatment area and/or the lid supply and/or the working space can be treated, in particular cleaned, with a treatment medium. As a consequence, hygiene is increased by a corresponding treatment device. Particularly preferably, the treatment device can comprise a ring nozzle, which is arranged in particular in a housing interior of the housing portion of the first section of the lid supply.

In practice, the treatment medium can be a liquid and/or gaseous treatment medium, in particular a disinfecting agent such as chlorine dioxide, a rinsing agent, in particular water, or a cleaning or drying gas, in particular air, or a treatment medium in the form of an electromagnetic radiation medium, in particular ultraviolet radiation, especially a pulsed light radiation, and/or wherein the liquid treatment medium and/or the gaseous treatment medium can be introduced into the treatment area under a predeterminable treatment pressure.

The sealer can comprise a discharge device for discharging a treatment residue. The discharge device can be arranged on the working space, in particular at least partially in the housing, to remove the treatment residue. In this case, the discharge device can be a drain, preferably a drain equipped with a filter, and/or a discharge device in the form of a suction device, preferably a suction device equipped with a filter.

According to the disclosure, a lid supply for supplying the plurality of lids in the lid stack to the working space of the sealer is further proposed. In this regard, the lid supply comprises the first section and the second section, wherein the lid supply comprises the seal which is arranged between the first section and the second section in such a way that the first section can be sealed off from the second section.

Particularly preferably, the lid supply comprises the housing portion which is arranged around the first section.

For a better guidance of the lid stack, the lid supply can comprise a guide element, in particular a guide rod or a guide rail for guiding the lid stack.

According to the disclosure, a method for supplying the lid to the sealer is also proposed. In the method according to the disclosure, the sealer according to the disclosure or the lid supply according to the disclosure is provided and the plurality of lids in the lid stack is supplied to the working space.

Elements for sealing the container can be arranged in the working space. An element for sealing the container can be a sealing head for attaching a lid to the container (i.e., for sealing the container with the lid). Particularly preferably, a plurality of sealing heads is arranged in the working space. The sealing head can comprise seaming means or device for seaming the lid to the container. The seaming means can be a seaming roller and a seaming head. The, or each sealing head can therefore comprise at least one seaming roller (particularly preferably two seaming rollers) and one seaming head. The sealing head can comprise seaming shafts rotatable about a seaming axis, wherein the seaming means is arranged at one end of the respective seaming shaft (seaming head and seaming roller can therefore be rotated in particular via respective seaming shafts).

In a particularly preferred embodiment, the plurality of sealing heads is arranged in the form of a carousel as known in the state of the art.

The sealer according to the disclosure can further comprise a lifting station (or a plurality of lifting stations) for lifting the container. The lifting stations can be arranged opposite the sealing heads as a part of the carousel.

In practice, the sealer can comprise a container supply for supplying the containers (such as a feeding table) to the working space and a container discharge for discharging the containers from the working space.

When sealing the containers, the lid and the container are supplied to the working space. Then, the lid is positioned on the container and the container is sealed with the lid. Then, the sealed container is discharged from the working space.

In particular, the sealing process can comprise the seaming of the lid to the container by at least one seaming roller (in particular two seaming rollers) and one seaming head.

The sealer according to the disclosure is preferably designed as a can sealer. The can sealer preferably has several similar stations (of preferably sealing heads and lifting stations, i.e., the carousel) arranged in a carousel shape, in which a can can be sealed in each case with a can lid.

Here, the container can be a can and the lid can be a can lid, which are seamed together by the can sealer.

For sealing the can, the can sealer preferably comprises several sealing heads (as described above with several seaming rollers and one seaming head). In the operating state, the seaming rollers with their respective seaming profile are brought into contact with a can lid flange of the can lid and a can flange of the can. By rotating the can, the seaming roller is then rotated in the circumferential direction of the can, thereby seaming the can flange with the can lid flange. For rotation of the can, the can is preferably clamped between the seaming head and a support (in particular the lifting station), whereby the seaming head with the seaming shaft is rotated about the seaming axis (i.e., the can is fixed in the axial and radial direction and rotated in the circumferential direction for sealing).

In the context of the disclosure, the can can be understood to be a rotationally symmetrical container which is sealed by the can sealer and the associated seaming roller. A can can preferably comprise a metal, in particular aluminum or steel.

The sealer according to the disclosure can comprise the carousel with the plurality of sealing heads as the seaming process. In addition, the sealer can comprise a first inlet for can bodies, in particular can bodies filled with a product, to the carousel and a second inlet for can lids to the carousel. In addition, the sealer can comprise an outlet for seamed cans from the carousel.

In principle, the sealer according to the disclosure can be analogous to the can sealers already known from the state of the art but differs in the lid supply.

In principle, the sealer can preferably comprise at least two types of seaming rollers with preferably different seaming profiles (wherein the corresponding sealing head comprises seaming rollers of both types), so that cans can be sealed according to a double-seam principle, in which the cans are generally sealed in two stages. One type of seaming roller is responsible for each stage. The first type of seaming roller makes a pre-scans, while the second type of seaming roller completely seals the can/package.

In the method according to the disclosure, can lids and can bodies can be brought together at a defined point before the actual seaming process. The supply of the can lids to the defined point is preferably carried out by a gassing rotor on which the can lids rest. As an alternative to the gassing rotor, a lid rotor with rails can also be used to transport the lids, Wherein the gassing is carried out via a linear gassing device which is arranged in a stationary manner. Then, the lids only rest on the rails and are moved by the lid rotor. The can bodies are supplied through the container supply. The can bodies pass from the container supply to one of the respective lifting stations (which are integrated into the carousel). On one revolution of the carousel, the lifting stations preferably perform a cam-controlled lifting motion to feed the can bodies from below to the can lids and later the seaming head.

In practice, known can sealers/sealers can be modified with the lid supply according to the disclosure, in order to avoid the disadvantages of the state of the art in this way.

BRIEF DESCRIPTION OF THE DRAWINGS

In the following, the disclosure and the state of the art are explained in more detail based on embodiments with reference to the drawings.

DETAILED DESCRIPTION

Figure 1:
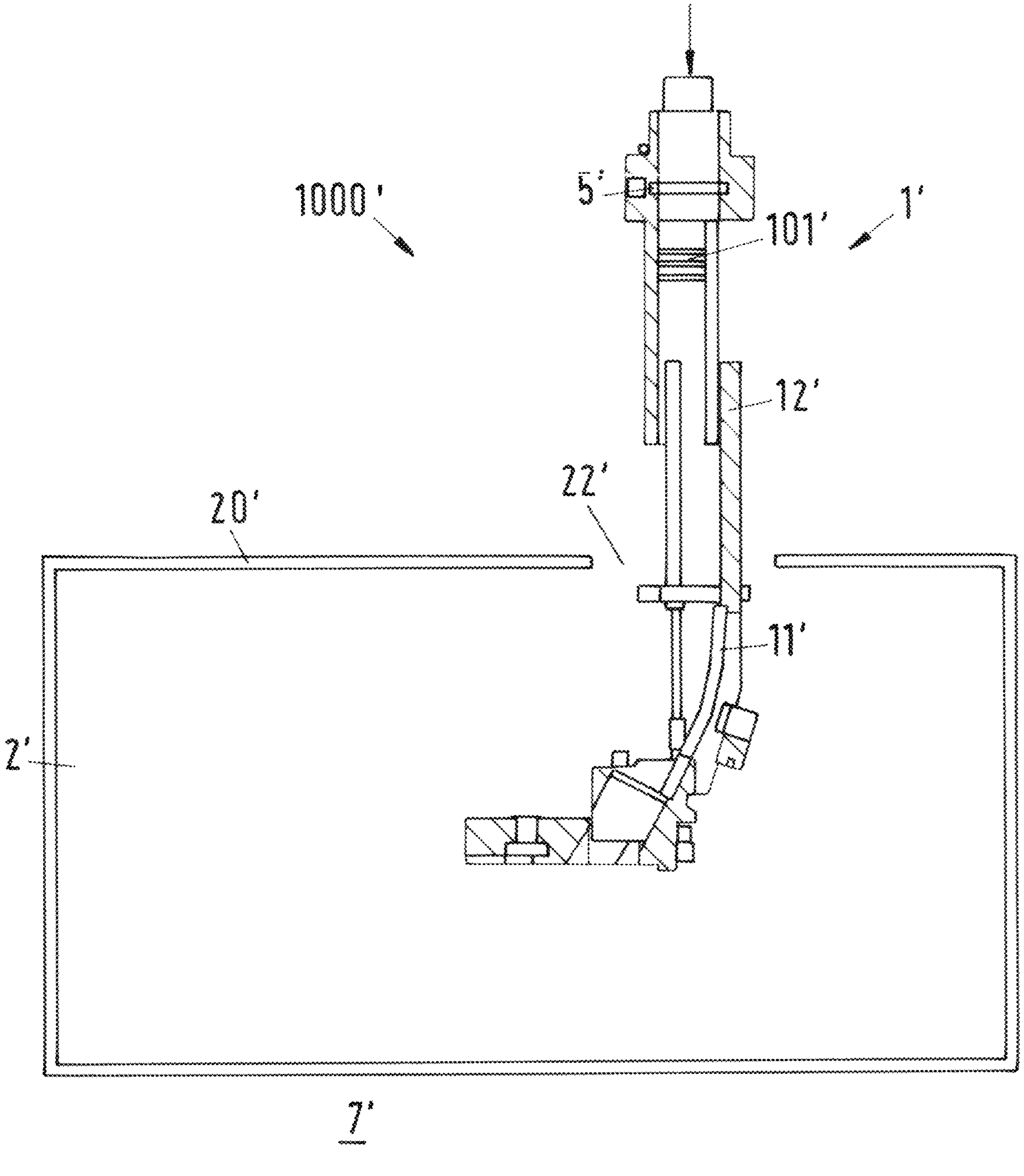
Fig.1 (Prior Art)
FIG. 1 illustrates a schematic representation of a state-of-the-art sealer.

FIG. 1 has already been described above in the presentation of the state of the art.

Figure 2:
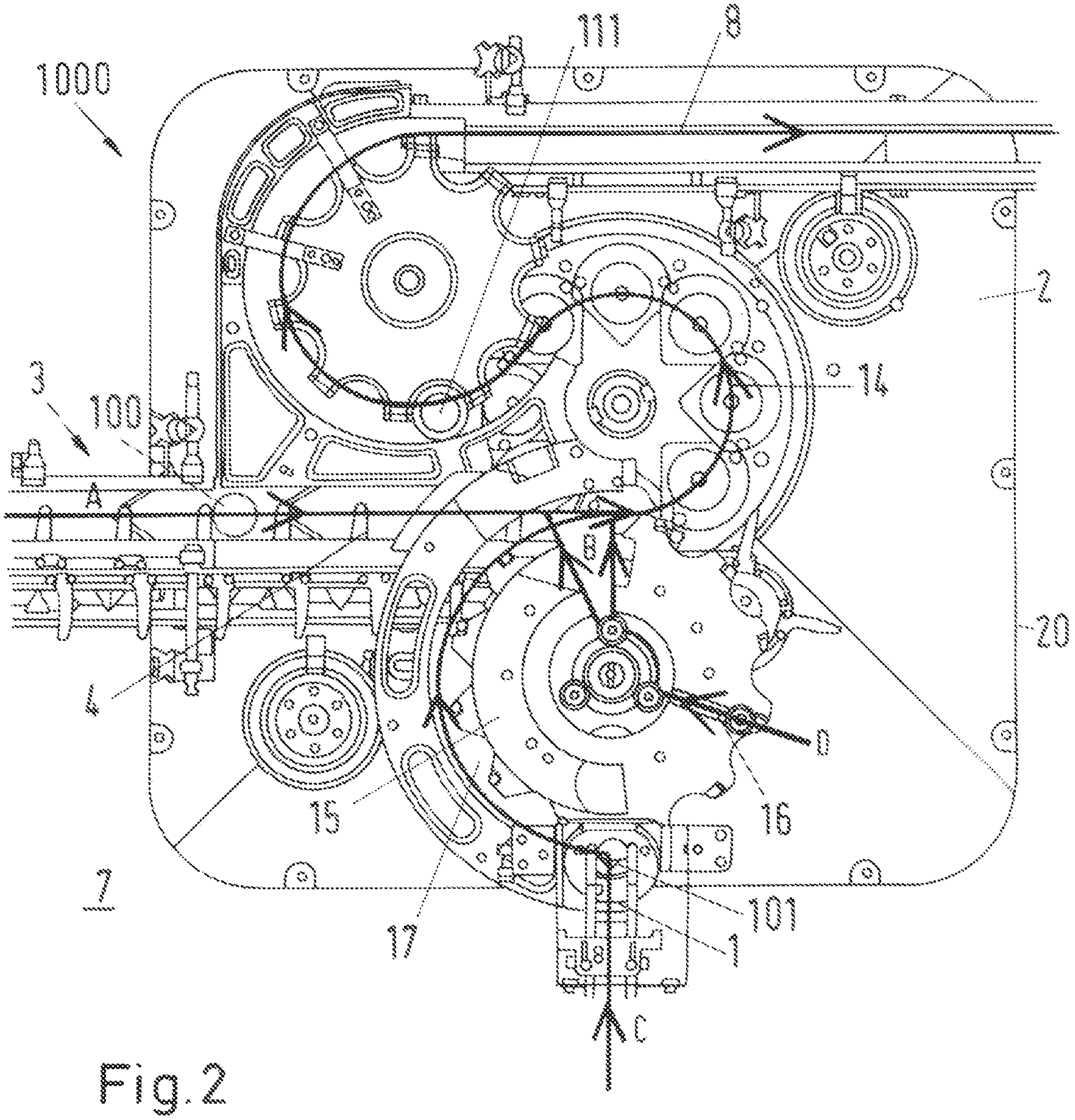
FIG. 2 illustrates a top view of a can sealer according to the disclosure.

FIG. 2 shows a top view of a sealer 1000 according to the disclosure which comprises a working space 2 in which containers 100 are sealed with a lid 101, i.e., a seaming process takes place. In this case, the working space 2 is surrounded by the housing 20, whereby the working space 2 is separated and closed off from an environment 7, so that the working space 2 can function as a hygienic area, i.e., a hygiene zone. In this way, a hygienic sealing of the container 100 is ensured.

The sealer 1000 for sealing the container 100 comprises a lid supply 1 for supplying the lid 101 to the working space 2 and to the container 100, a gassing rotor 15 for supplying gas to the container 100, and a sealer station 14 for closing the container 100 with the lid 101.

The sealer station 14 is arranged in the working space 2 and designed as a carousel, which comprises a plurality of similar stations of sealing heads (for seaming) arranged in a carousel shape and lifting stations (for transporting and moving).

In the represented embodiment, the sealer 1000 is preferably designed as a can sealer 1000. The container 100 is a can 100, which is seamed with the lid 101 in the sealer station 14.

In the operating state, the lid 101 is introduced into the can sealer 1000 through the lid supply 1 along the arrow C. In this process, the lids 101 are arranged on the gassing rotor 1:5. By rotation of the gassing rotor 15, the lids 101 are transported further. Then, the containers 100 are introduced through the container supply 3 along arrow A into the container receptacles 17 of the gassing rotor 15. There, the container 100 is gassed in area B with a gas such as carbon dioxide or nitrogen and combined with the lid 101.

The gassing is carried out along the arrow D with the gas supply 16, After gassing, the container 100 with the lid 101 is moved on from the gassing rotor 15 to the sealer station 14 and is sealed there. As an alternative to the gassing rotor 15, a lid rotor with rails can also be used to transport the lids, whereby the gassing is carried out via a linear gassing device which is arranged in a stationary manner. Then, the lids rest only on the rails and are moved by the lid rotor.

Finally, the sealed container 111 is discharged from the working space 2 by the container discharge 8.

Figure 3:
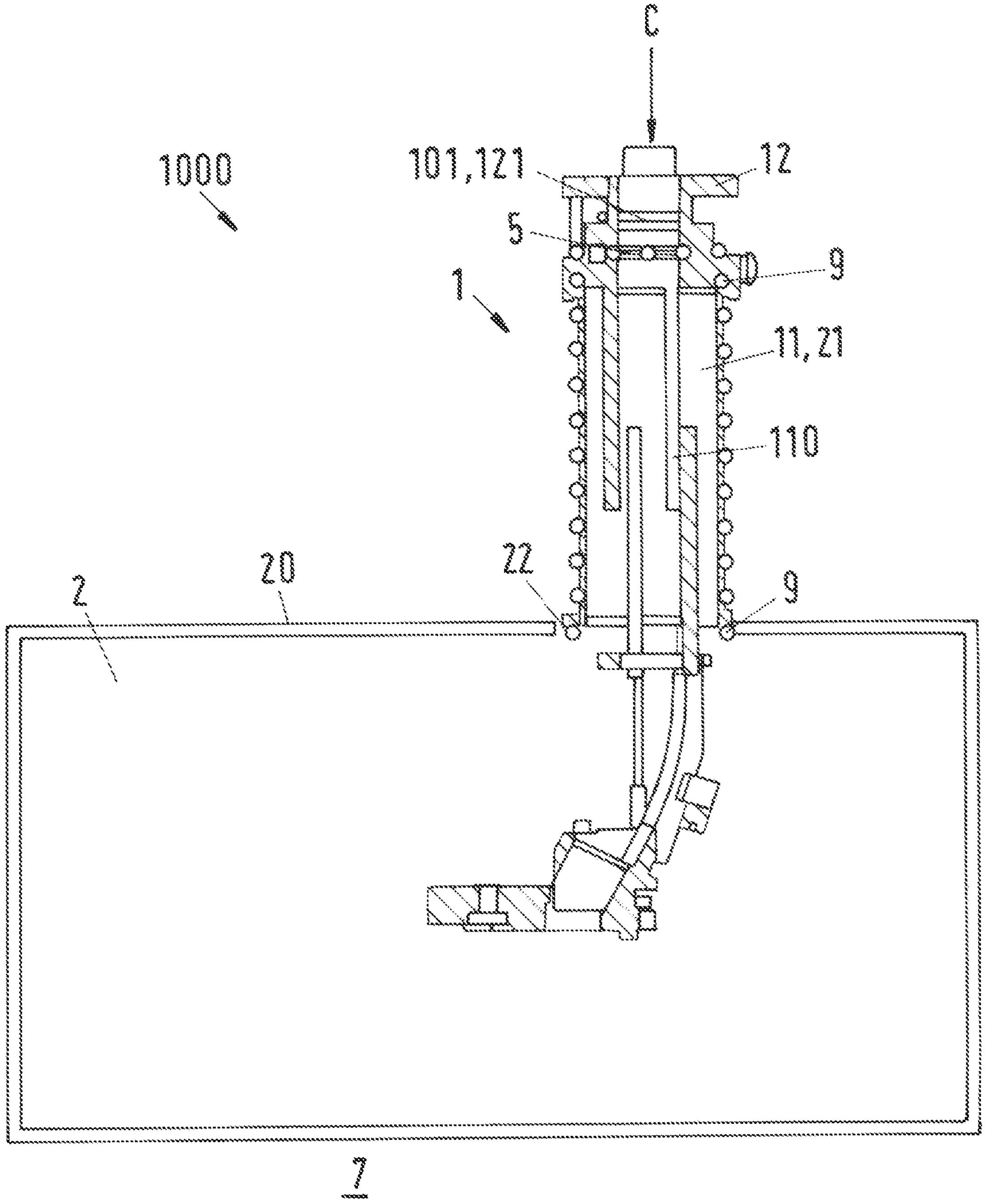
FIG. 3 illustrates a schematic representation of a can sealer according to the disclosure.

FIG. 3 shows a schematic representation of a can sealer 1000 according to the disclosure.

The can sealer 1000 comprises the working space 2, in which the seaming process takes place and is surrounded by the housing 20.

In addition, the can sealer 1000 comprises the lid supply 1 for supplying the plurality of the lids 101 in a lid stack 121 to the working space 2. In this regard, the lid supply 1 comprises a first section 11 which is arranged in the working space 2 and a second section 12 arranged outside the working space.

The first section 11 is partly arranged in the housing 20 (i.e., it is surrounded by it) and partly arranged in a housing portion 21 of the housing 20. The housing portion 21 is a part of the housing 20, which forms a kind of tubular housing extension (i.e., a tube) and thus "extends" the working space 2, i.e., the hygiene zone.

The lid supply 1 further comprises a seal 5, which is arranged between the first section 11 and the second section 12 and thus enables a sealing of the first section 11 with respect to the second section 12. However, a permanent seal need not be provided here.

Indeed, the seal 5 is designed as a lid clamp 5 and the working space 2 can be sealed by a cooperation of the lid clamp 5 with the lid stack 121.

The working space 2 is thus extended to the lid clamp 5 with the aid of the tube 20. In the embodiment shown, the tube 20 is sealed at the top and bottom with further sealing elements 9 in the form of an O-ring 9. In doing so, an additional sealing and separation of the working space 2 is enabled.

The lid clamp 5 is designed as an inflatable seal 5. This means that the lid clamp 5 can be expanded from a first state to a second state by supplying air/gas (e.g., in the form of a pneumatic air) into an expansion space, so that the lid stack 121 can be held by the lid clamp 5 in the second (expanded) state. In this expanded "holding" state, a sealing is achieved between the lid stack 121 and the lid clamp 5.

In this way, a large lift can be achieved and the working space 2 can be sealed cleanly. By switching off the pneumatic air and any vacuum, the seal 5 can be compressed (the expansion is therefore reversible). When the pneumatic air is switched on again, the seal 5 is active again.

Due to the seal 5, it is thus enabled that the working space 2 is separated and closed off from the environment 7, so that the working space 2 functions as a hygienic area, i.e., the hygiene zone. Due to the seal 5 with housing 20 and housing portion 21, an undesired entry of gases, vapors, solids and/or liquids from the second section 12 into the first section 11 and thus from the environment 7 into the working space 2 can therefore be prevented or at least reduced.

In addition, the lid supply 1 comprises several guide rods 110 for guiding the lid stack 121.

As an alternative to the embodiment according to FIG. 3, the seal/lid clamp 5 could also be arranged at an opening 22 of the housing 20 and the housing portion 21 could be dispensed with.

The lids 101 are supplied to the working space through the lid supply 1 in the lid stack 121. There, the lids 101 are removed individually from the lid stack 121 by a destacking device and positioned on a lid starwheel/gassing starwheel, from which they are guided to the containers and placed on the containers.

Figure 4:
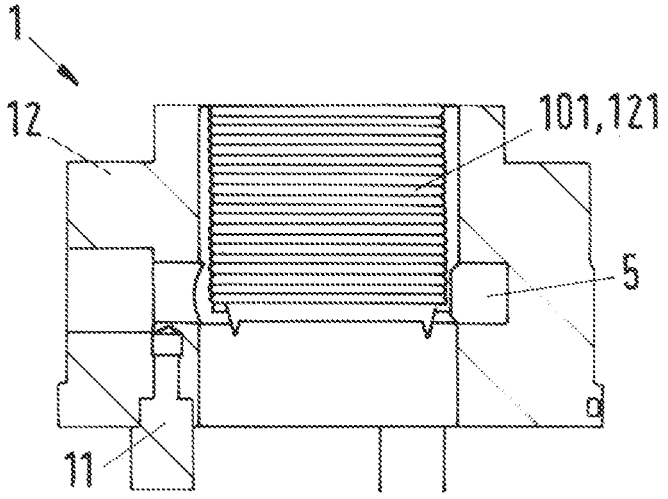
FIG. 4 illustrates a side view of a lid supply according to the disclosure with seal.

FIG. 4 shows a side view of the lid supply 1 according to the disclosure with seal 5. Here, the seal 5 is inflatable and shown on the left side of the representation in the first (compressed) state and on the right side in the second (expanded) state.

Figure 5:
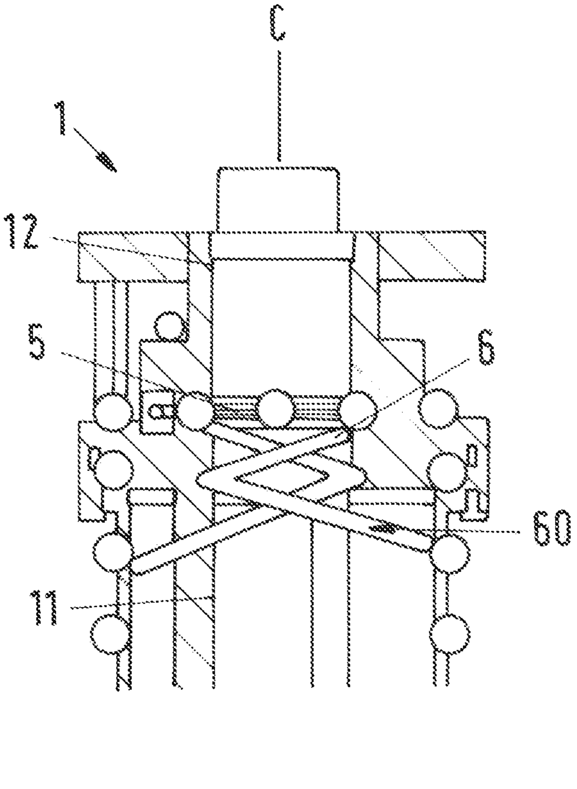
FIG. 5 illustrates a side view of a lid supply according to the disclosure with treatment device.

FIG. 5 shows a side view of the lid supply 1 according to the disclosure with treatment device 6. The treatment device 6 is designed as a ring nozzle 6 arranged under the lid clamp 5. Lids in the treatment area 60 can be cleaned by the ring nozzle 6, However, as an alternative or in addition, the working space 2 and/or the lid supply 1 can also be cleaned by the ring nozzle. The ring nozzle 6 is a ring with several nozzles, some of which clean upwards and some downwards. The entire tube 21 is cleaned by reflection and gravity.

Figure 6:
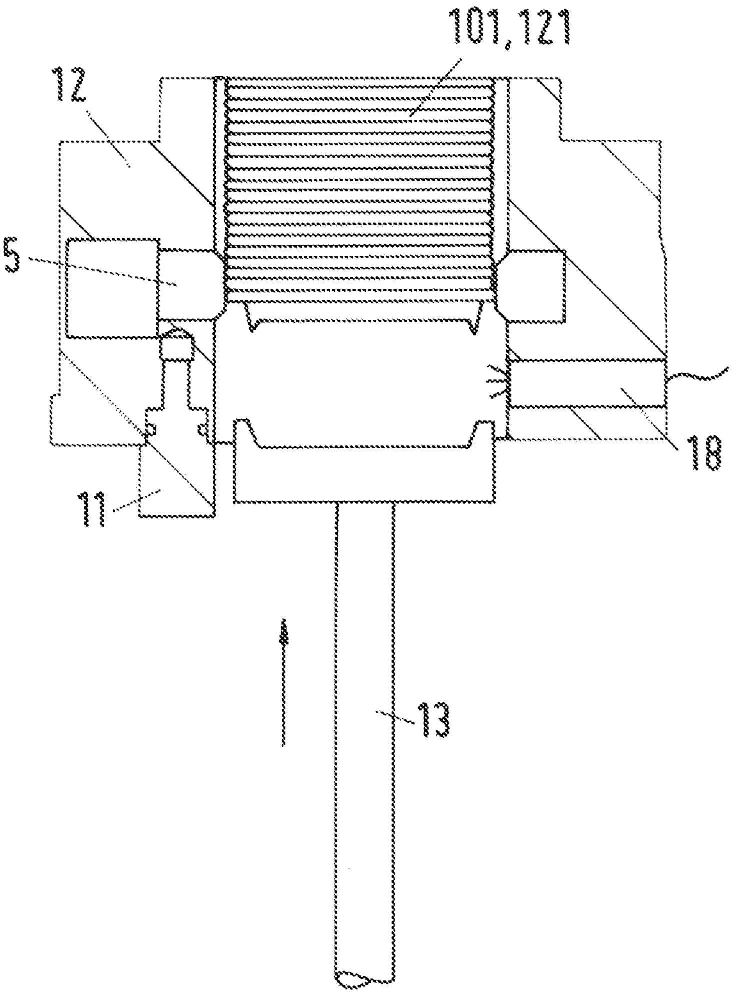
FIG. 6 illustrates a side view of a lid supply according to the disclosure with sensor.

FIG. 6 shows a side view of the lid supply 1 according to the disclosure with sensor.

To carry out the cleaning of the lid supply 1, all lids 101 located below the lid clamp 5 are preferably removed before cleaning. These can be removed manually in the first section 11, After cleaning, the lid stack 121 must be placed down again. The lid stack 121 can be placed down again by an auxiliary means or device 13. If the auxiliary means 13 is below the lid 101, the position is detected with the magnetic sensor 18 and the lid clamp 5 is set to inactive.

The disclosure is not limited to the disclosed embodiments. Other variations of the disclosed embodiments can be understood and effected by persons skilled in the art in practicing a claimed disclosure from a study of the drawings, the disclosure, and the dependent claims. In the claims, the word "comprising" does not exclude other elements or steps, and the indefinite article "a" or "a" does not exclude a plurality. The mere fact that certain measures are repeated in mutually different dependent claims does not mean that a combination of these measures cannot be advantageously used. Any reference signs in the claims should not be interpreted as limiting the scope.

The invention claimed is:

1. A sealer for scaling a container comprising:

a working space, the container capable of being sealed with a lid from a plurality of lids in the working space;

a housing surrounding the working space; and a lid supply configured to supply the plurality of the lids in a lid stack to the working space;

the lid supply comprising a first section which is arranged in the working space in such a way that the first section is surrounded by the housing, and a second section arranged outside the housing, and the lid supply comprising a seal arranged between the first section and the second section in such a way that the first section is capable of being sealed off from the second section, the seal being a lid clamp sealing off the first section from the second section when stopping the lid stack by exerting a force on the lid stack.

2. The sealer according to claim 1, wherein the lid clamp is capable of being expanded from a first state to a second state so that the lid stack is capable of being held by the lid clamp in the second state.

3. The sealer according to claim 2, wherein the lid clamp comprises an expansion space which is capable of being filled with a fluid for expansion into the second state.

4. The sealer according to claim 3, wherein the fluid is a gas and/or a liquid.

5. The sealer according to claim 1, wherein the housing comprises a housing portion arranged around a part of the first section in such a way that the working space is enlarged.

6. The sealer according to claim 1, wherein the lid supply comprises a treatment device, so that the lids in a predeterminable treatment area and/or the lid supply and/or the working space first section are treated with a treatment medium.

7. The sealer according to claim 6, wherein the treatment device comprises a ring nozzle.

8. The sealer according to claim 6, wherein the treatment medium is a liquid and/or gaseous treatment medium or a cleaning or drying gas, or an electromagnetic radiation medium.

9. The sealer according to claim 6, wherein the treatment medium is a disinfecting agent or an electromagnetic radiation medium.

10. The sealer according to claim 9, wherein the disinfecting agent is chlorine dioxide, water, or air.

11. The sealer according to claim 9, wherein the electromagnetic radiation medium is ultraviolet radiation.

12. The sealer according to claim 6, wherein the liquid treatment medium or the gaseous treatment medium is capable of being introduced into the treatment area under a predeterminable treatment pressure.

13. The sealer according to claim 1, wherein a discharge device is provided at the working space to remove a treatment residue.

14. The sealer according to claim 1, wherein the housing is tubular and comprises a housing portion arranged around a part of the first section in such a way that the working space is enlarged.

15. A lid supply for supplying a plurality of lids in a lid stack to a working space of a sealer comprising a first section and a second section, the lid supply comprising:

a seal which is a lid clamp arranged between the first section and the second section in such a way that the first section is capable of being sealed off from the second section when stopping the lid stack by exerting a force on the lid stack.

16. The lid supply according to claim 15, comprising a housing portion arranged around the first section.

17. The lid supply according to claim 15, comprising a guide element or a guide rail to guide the lid stack.

18. A method of supplying a lid to a sealer comprising:

providing the sealer according to claim 1; and supplying the plurality of the lids in the lid stack to the working space.

* * * * *